United States Patent
Ikeda et al.

(10) Patent No.: US 9,527,506 B2
(45) Date of Patent: Dec. 27, 2016

(54) DEVICE AND METHOD FOR CONTROLLING HYBRID VEHICLE

(71) Applicant: Nissan Motor Co., Ltd., Kanagawa (JP)

(72) Inventors: Naoyasu Ikeda, Kanagawa (JP); Kenichi Saga, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/026,114

(22) PCT Filed: Sep. 30, 2013

(86) PCT No.: PCT/JP2013/076516
§ 371 (c)(1),
(2) Date: Mar. 30, 2016

(87) PCT Pub. No.: WO2015/045146
PCT Pub. Date: Apr. 2, 2015

(65) Prior Publication Data
US 2016/0244051 A1 Aug. 25, 2016

(51) Int. Cl.
*B60W 20/40* (2016.01)
*B60W 20/00* (2016.01)
(Continued)

(52) U.S. Cl.
CPC .......... *B60W 20/40* (2013.01); *B60K 6/24* (2013.01); *B60K 6/26* (2013.01); *B60K 6/36* (2013.01);
(Continued)

(58) Field of Classification Search
CPC ...... B60W 20/40; B60W 10/02; B60W 10/06; B60W 10/08; B60W 10/107; B60W 10/30; B60W 50/045; B60W 2400/00; B60W 2510/0638; B60W 2510/081; B60W 2540/10; B60W 2710/021; B60W 2710/06; B60W 2710/08; B60W 2710/30; B60K 6/24; B60K 6/26; B60K 6/36; B60K 6/387; B60K 6/40; B60Y 2200/92; B60Y 2300/182; Y10S 903/905; Y10S 903/906; Y10S 903/909; Y10S 903/914; Y10S 903/93; Y10S 903/951
(Continued)

(56) References Cited

U.S. PATENT DOCUMENTS

| | | | |
|---|---|---|---|
| 6,211,681 B1 * | 4/2001 | Kagawa | B60K 6/46 320/104 |
| 6,524,217 B1 * | 2/2003 | Murakami | B60K 6/365 180/65.225 |

(Continued)

FOREIGN PATENT DOCUMENTS

| | | |
|---|---|---|
| JP | 2000-023309 A | 1/2000 |
| JP | 2002-327840 A | 11/2002 |

(Continued)

*Primary Examiner* — McDieunel Marc
*Assistant Examiner* — James E Stroud
(74) *Attorney, Agent, or Firm* — Osha Liang LLP

(57) ABSTRACT

A control device for a hybrid vehicle having an engine, a motor, a clutch and an air conditioner, the engine and the motor being connected to each other via the clutch, the air conditioner having a compressor driven by the engine, has a controller. The hybrid vehicle has an EV mode in which the engine is disconnected from the motor by release of the clutch, and an HEV mode in which the engine rotates together with the motor by engagement of the clutch. The controller is configured to execute a diagnosis of whether the clutch is in a released state during selection of the EV mode. When the HEV mode is selected in response to an operation request for the air conditioner, the controller temporality switches the running mode to the EV mode based on a (Continued)

running history of the hybrid vehicle in a stop state of the hybrid vehicle.

5 Claims, 4 Drawing Sheets

(51) Int. Cl.

| | |
|---|---|
| *B60W 10/06* | (2006.01) |
| *B60W 10/08* | (2006.01) |
| *B60W 10/02* | (2006.01) |
| *B60W 10/30* | (2006.01) |
| *B60W 50/04* | (2006.01) |
| *B60W 10/107* | (2012.01) |
| *B60K 6/24* | (2007.10) |
| *B60K 6/26* | (2007.10) |
| *B60K 6/36* | (2007.10) |
| *B60K 6/387* | (2007.10) |
| *B60K 6/40* | (2007.10) |

(52) U.S. Cl.
CPC ............... *B60K 6/387* (2013.01); *B60K 6/40* (2013.01); *B60W 10/02* (2013.01); *B60W 10/06* (2013.01); *B60W 10/08* (2013.01); *B60W 10/107* (2013.01); *B60W 10/30* (2013.01); *B60W 50/045* (2013.01); *B60W 2400/00* (2013.01); *B60W 2510/0638* (2013.01); *B60W 2510/081* (2013.01); *B60W 2520/10* (2013.01); *B60W 2540/10* (2013.01); *B60W 2710/021* (2013.01); *B60W 2710/06* (2013.01); *B60W 2710/08* (2013.01); *B60W 2710/30* (2013.01); *B60Y 2200/92* (2013.01); *B60Y 2300/182* (2013.01); *Y10S 903/905* (2013.01); *Y10S 903/906* (2013.01); *Y10S 903/909* (2013.01); *Y10S 903/914* (2013.01); *Y10S 903/93* (2013.01); *Y10S 903/951* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 8,864,538 | B1* | 10/2014 | Arbuckle | B63H 21/383 |
| | | | | 440/88 C |
| 9,043,058 | B1* | 5/2015 | Camp | B63H 23/02 |
| | | | | 701/21 |
| 2012/0203411 | A1* | 8/2012 | Mallebrein | B60K 6/48 |
| | | | | 701/22 |
| 2015/0353128 | A1* | 12/2015 | Shibuya | B60W 10/02 |
| | | | | 701/41 |
| 2016/0046284 | A1* | 2/2016 | Inoue | B60K 6/48 |
| | | | | 701/22 |

FOREIGN PATENT DOCUMENTS

| | | |
|---|---|---|
| JP | 2013-071499 A | 4/2013 |
| JP | 2013-107539 A | 6/2013 |
| JP | 2013-159330 A | 8/2013 |

* cited by examiner

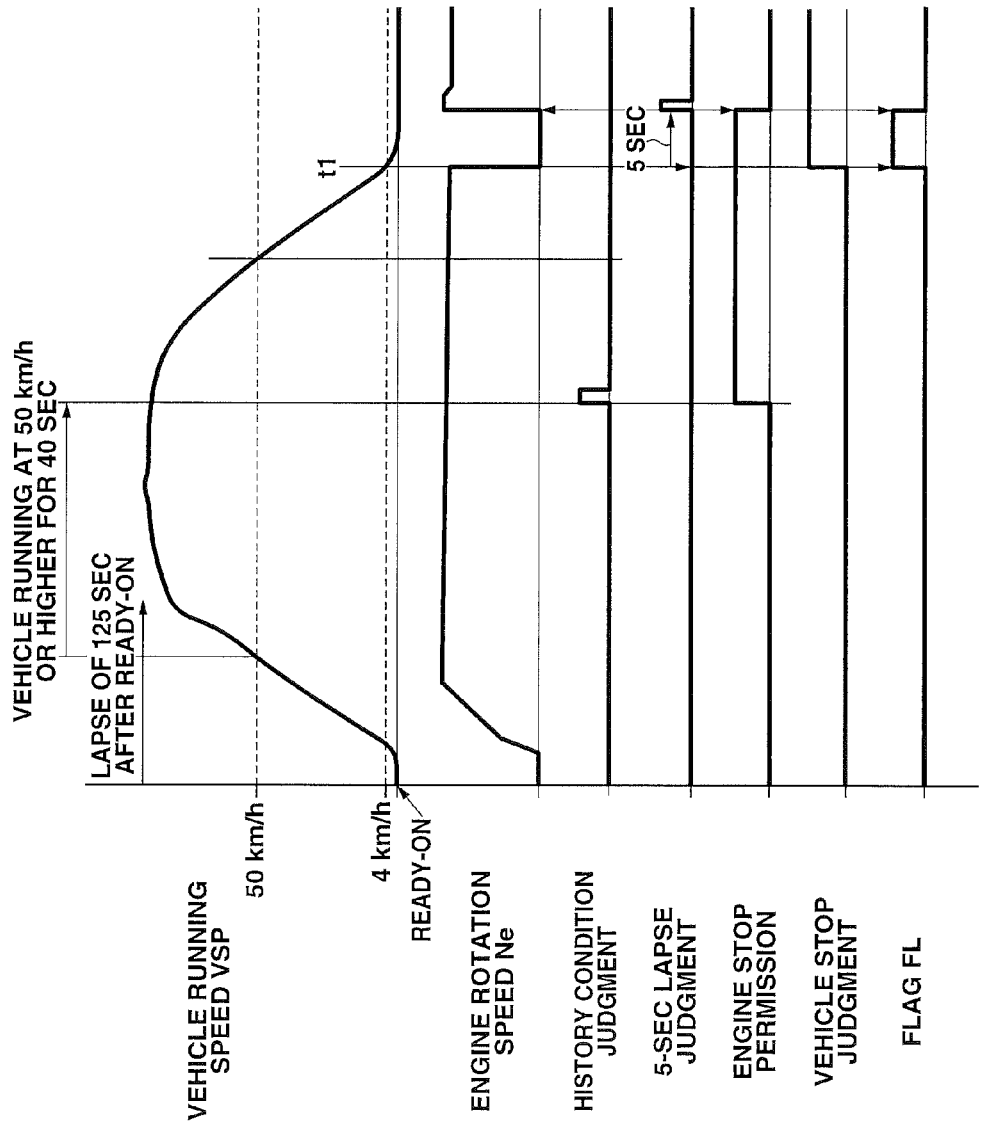

DEVICE AND METHOD FOR CONTROLLING HYBRID VEHICLE

BACKGROUND

Field of the Invention

The present invention relates to control of a hybrid vehicle having, as a vehicle driving source, an engine and a motor connected to each other via a clutch and, more particularly, to control of the hybrid vehicle in which a compressor of an air conditioner is driven by the engine.

Related Art

There is known a hybrid vehicle having an engine and a motor as a vehicle driving source. For example, Patent Document 1 discloses a hybrid vehicle having an engine, a motor generator arranged between the engine and driving wheels and disconnectably connected to the engine via a clutch and a manual clutch disposed between the motor generator and an input shaft of a transmission.

Patent Document 2 discloses a hybrid vehicle having an engine, a motor generator and an air conditioner, with a compressor of the air conditioner being driven by the engine, such that a torque of the engine and a torque of the motor generator are controlled in accordance with a load of the compressor.

Further, Patent Document 3 discloses a technique for diagnosing whether or not a transmission clutch of a vehicle is in a fixed state.

Patent Document 1: Japanese Laid-Open Patent Publication No. 2013-159330

Patent Document 2: Japanese Laid-Open Patent Publication No. 2000-23309

Patent Document 3: Japanese Laid-Open Patent Publication No. 2002-327840

SUMMARY

One or more embodiments of the present invention, at an early stage after a start of a hybrid vehicle in which a clutch is arranged between an engine and a motor, diagnoses that the clutch is not in a fixed state.

According to one or more embodiments of the present invention, there is provided a control device for a hybrid vehicle, the hybrid vehicle comprising an engine, a motor, a clutch and an air conditioner, the engine and the motor being connected to each other via the clutch, the air conditioner having a compressor driven by the engine, the hybrid vehicle having, as a running mode, an EV mode in which the engine is disconnected from the motor by release of the clutch and an HEV mode in which the engine rotates together with the motor by engagement of the clutch, wherein, during selection of the EV mode, the control device executes a diagnosis of whether the clutch is in a released state; and wherein, when the HEV mode is selected in response to an operation request for the air conditioner, the control device temporality switches the running mode to the EV mode based on a running history of the hybrid vehicle in a stop state of the hybrid vehicle and then executes the diagnosis.

The clutch, which is arranged between the engine and the motor, should be released during selection of the EV mode. It is thus possible to diagnose whether or not the clutch is normally in the released state by e.g. comparing a rotation speed of the engine with a rotation speed of the engine or checking the presence or absence of torque transmission between the engine and the motor.

In the case where the compressor of the air conditioner is driven by the engine, the HEV mode is selected in response to the requirement for cooling by the air conditioner. As the clutch is engaged in the HEV mode, there is no need to diagnose whether the clutch is in a fixed state. In one or more embodiments of the present invention, however, the vehicle control device is configured to, when it is assumed based on the vehicle running history that the interior of the vehicle is sufficiently cooled, temporality switch the running mode to the EV mode in the stop state of the vehicle and diagnose whether the clutch is normally in the released state during the EV mode. In other words, the vehicle control device is configured to decide whether or not to permit a short-term stop of the air conditioner based on the vehicle running history. It is thus possible to, even when the operation of the vehicle is started in the HEV mode, complete the diagnosis of the clutch at an early stage.

BRIEF DESCRIPTION OF DRAWINGS

FIG. 5 is a time chart showing effects of one or more embodiments of the present invention.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
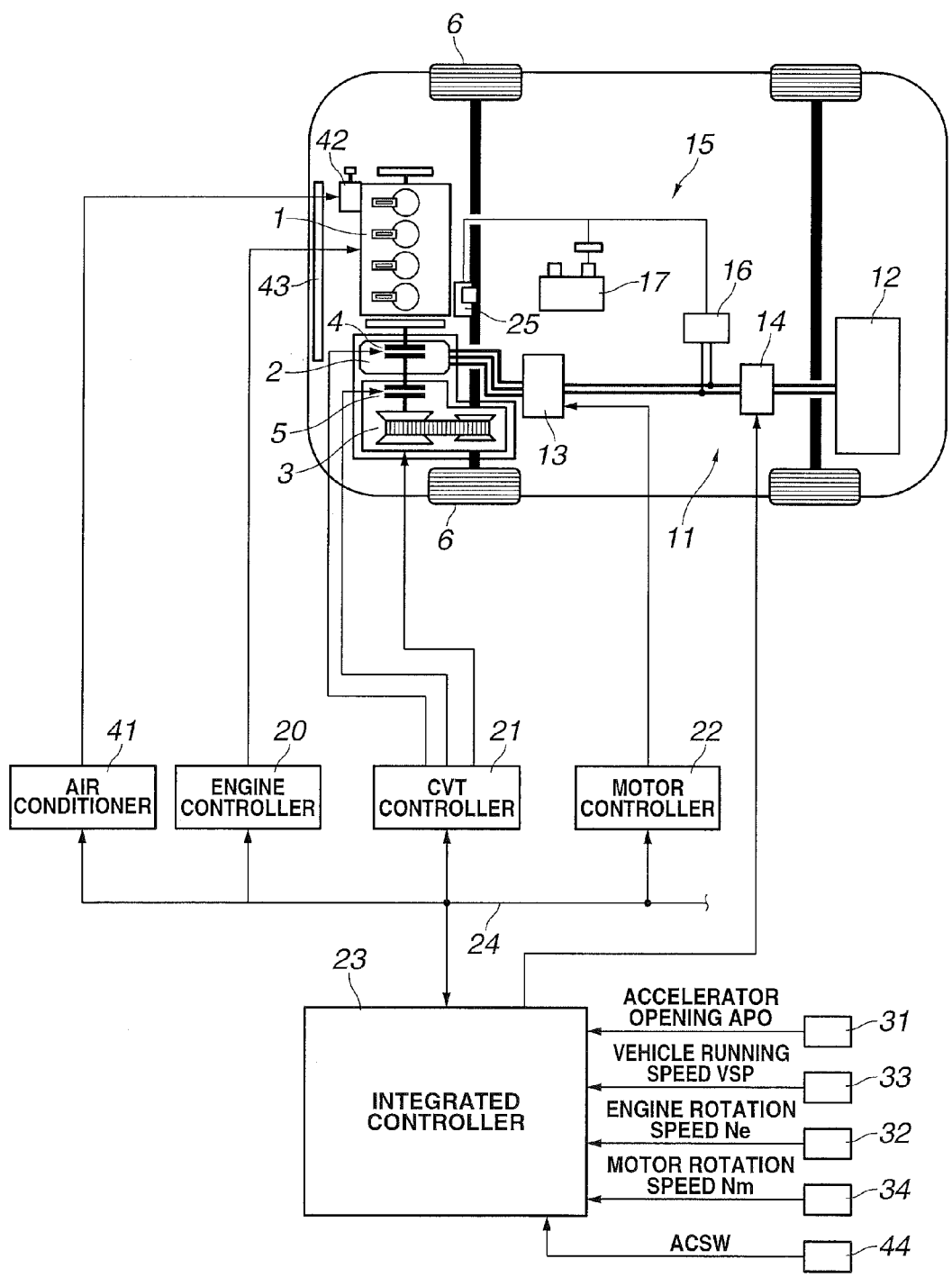
FIG. 1 is a system configuration diagram of a hybrid vehicle according to one or more embodiments of the present invention.

FIG. 1 is a system configuration diagram of a FF-type (front engine/front drive) hybrid vehicle as an example of a hybrid vehicle according to one or more embodiments of the present invention.

The hybrid vehicle has an engine 1 and a motor generator 2 as a vehicle driving source and a belt-type continuously variable transmission 3 as a transmission mechanism. A first clutch 4 is disposed between the engine 1 and the motor generator 2. A second clutch 5 is disposed between the motor generator 2 and the belt-type continuously variable transmission 3.

The engine 1 is in the form of e.g. a gasoline engine. Start/stop control, throttle opening control and fuel cut control of the engine 1 are performed based on control commands from an engine controller 20.

The first clutch 4 is arranged between an output shaft of the engine 1 and a rotor of the motor generator 2 so as to connect or disconnect the engine 1 to or from the motor generator 2 according to a selected vehicle running mode. Engagement/release of the first clutch 4 is controlled with the application of a first clutch hydraulic pressure by a hydraulic unit based on a control command from a CVT controller 21. In one or more embodiments of the present invention, the first clutch 4 is of the normally open type.

The motor generator 2 is in the form of e.g. a three-phase synchronous motor generator. The motor generator 2 is coupled to a high power circuit 11, which includes a high-voltage battery 12, an inverter 13 and a power relay 14, and is driven based on a control command from a motor controller 22 so as to perform not only a motor function (called "power running function") for generating a positive torque by the supply of power from the high-voltage battery 12 through the inverter 13 but also a regenerative function for generating electric power by absorption of a torque and charging the high-voltage battery 12 through the inverter 13.

The second clutch 5 is arranged between the rotor of the motor generator 2 and an input shaft of the continuously variable transmission 3 so as to transfer or disconnect driving power from the vehicle driving source such as engine 1 and motor generator 2 to driving wheels 6 (front wheels). Engagement/release of the second clutch 5 is controlled with the application of a second clutch hydraulic pressure by the hydraulic unit based on a control command from the CVT controller 21. In particular, the second clutch 5 can be brought into a slip engagement state so as to allow power transmission with clutch slippage by variably controlling the transmission torque capacity of the second clutch 5. This enables smooth starting of the vehicle and achieves creep running of the vehicle even without a torque converter.

It is herein feasible to utilize a forward clutch or reverse brake of a forward/reverse switching device mounted on an input part of the continuously variable transmission 3, rather than to utilize a single friction element, as the second clutch 5. The forward/reverse switching device is provided to switch the direction of input of the torque to the continuously variable transmission 3 between a forward direction for forward running and a reverse direction for reverse running and, although not specifically shown in the drawing, includes a planetary gear train, a forward clutch engaged during the forward running and a reverse brake engaged during the reverse running The forward clutch serves as the second clutch 5 during the forward running, whereas the reverse brake serves as the second clutch 5 during the reverse running When both of the forward clutch and the reverse clutch as the second clutch 5 are released, the rotor of the motor generator 2 and the continuously variable transmission 3 are substantially disconnected from each other with no torque transmission. Each of the forward clutch and the reverse clutch is of the normally open type in one or more embodiments of the present invention.

The belt-type continuously variable transmission 3 includes an input-side primary pulley, an output-side secondary pulley and a metal belt wound around the primary and secondary pulleys. The radii of contact of the primary and secondary pulleys with the belt are respectively changed with the application of primary and secondary hydraulic pressures by the hydraulic unit based on command signals from the CVT controller 21, thereby continuously varying a transmission gear ratio. An output shaft of the continuously variable transmission 3 is connected to the driving wheels 6 via a final reduction gear mechanism.

Further, the engine 1 is equipped with a starter motor 25 for engine starting. The starter motor 25 is in the form of e.g. a direct-current motor whose rated voltage is lower than that of the motor generator 2. The starter motor 25 is coupled to a low power circuit 15, which includes a DC/DC converter 16 and a low-voltage battery 17, and is driven based on a control command from the engine controller 20 for cranking of the engine 1.

The hybrid vehicle has an air conditioner 41 provided with a compressor 42, a capacitor 43, a blower fan etc. The compressor 42 of the air conditioner 41 is mechanically driven by output of the engine 1 through an electromagnetic clutch.

The low-voltage battery 17 is charged with power from the high power circuit 11, which includes the high-voltage battery 12, through the DC/DC converter 16. The control system such as engine controller 20, the air conditioner 41, the audio system, the lightening system etc. of the vehicle are supplied with power from the low power circuit 15.

The control system of the hybrid vehicle includes, in addition to the engine controller 20, the CVT controller 21 and the motor controller 22, an integrated controller 23 for integrated control of the entire vehicle. These controllers 20, 21, 22 and 23 are in communication with one another via a CAN communication line 24 for information exchange. There are provided various sensors such as accelerator opening sensor 31, engine speed sensor 32, vehicle speed sensor 33 and motor speed sensor 34. Detection signals of these sensors are inputted into the respective controllers such as integrated controller 23 individually or through the CAN communication line 24. There is also provided an air conditioner switch 44 to generate a signal ACSW for requesting operation of the air conditioner switch 44. The signal ACSW of the air conditioner switch 44 is inputted into the integrated controller 23.

The above-configured hybrid vehicle has, as its running mode, an electric running mode (hereinafter referred to as "EV mode"), a hybrid running mode (hereinafter referred to as "HEV mode"), a driving torque control starting mode (hereinafter referred to as "WSC mode") etc. Any suitable one of these modes is selected as the running mode according to the vehicle operation state, driver's accelerator operation and the like.

In the EV mode, only the motor generator 2 is used as the vehicle driving source by release of the first clutch 4. The EV mode includes a motor running mode and a regenerative running mode. The EV mode is selected in the range where the driver's required driving force is relatively small.

In the HEV mode, both of the engine 1 and the motor generator 2 are used as the vehicle driving source by engagement of the first clutch 4. In one or more embodiments of the present invention, the HEV mode includes a motor assist running mode, a running power generation mode and an engine running mode. The EV mode is selected in the range where the driver's required driving force is relatively large or in the case where there is a demand from the system according to the state of charge (SOC) of the high-voltage battery 12, the operation state of the vehicle and the like. When the signal ACSW of the air conditioner switch 44 is ON, the HEV mode is selected for driving of the compressor 42.

The WSC mode is selected in the range where the vehicle running speed is relatively low, e.g., at a start of the vehicle. In the WSC mode, the second clutch 5 is brought into a slip engagement state by varying the torque transmission capacity of the second clutch 5 while controlling the rotation speed of the motor generator 2.

Figure 2:
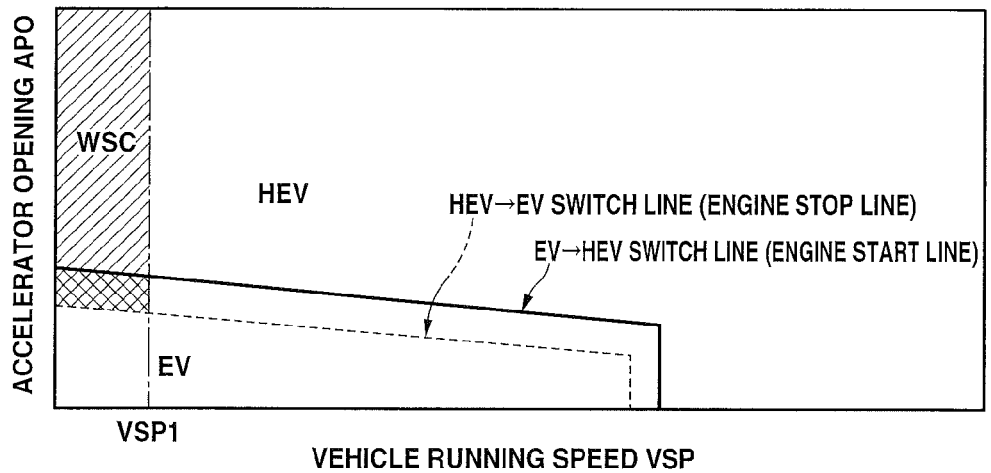
FIG. 2 is a diagram showing mode switching characteristics of the hybrid vehicle.

FIG. 2 is a diagram showing the basic characteristics of switching among the EV mode, the HEV mode and the WSC mode on the basis of the vehicle running speed VSP and the accelerator opening APO. As shown in the diagram, the mode switching characteristics are set with appropriate hysteresis between an HEV-to-EV mode switch line for switching from the HEV mode to the EV mode and an EV-to-HEV mode switch line for switching from the EV mode to the HEV mode. Further, the mode switching characteristics are set so as to allow selection of the WSC mode in the range where the vehicle running speed is lower than or equal to a predetermined vehicle running speed value VSP1.

Next, a failure diagnosis process of the first clutch 4 will be explained below with reference to a flowchart of FIG. 3. As mentioned above, the first clutch 4 is of the normally open type in the one or more embodiments of the present invention. The diagnosis process is programmed to, during selection of the EV mode, diagnose whether or not the first clutch 4 is normally in a released state.

Figure 3:
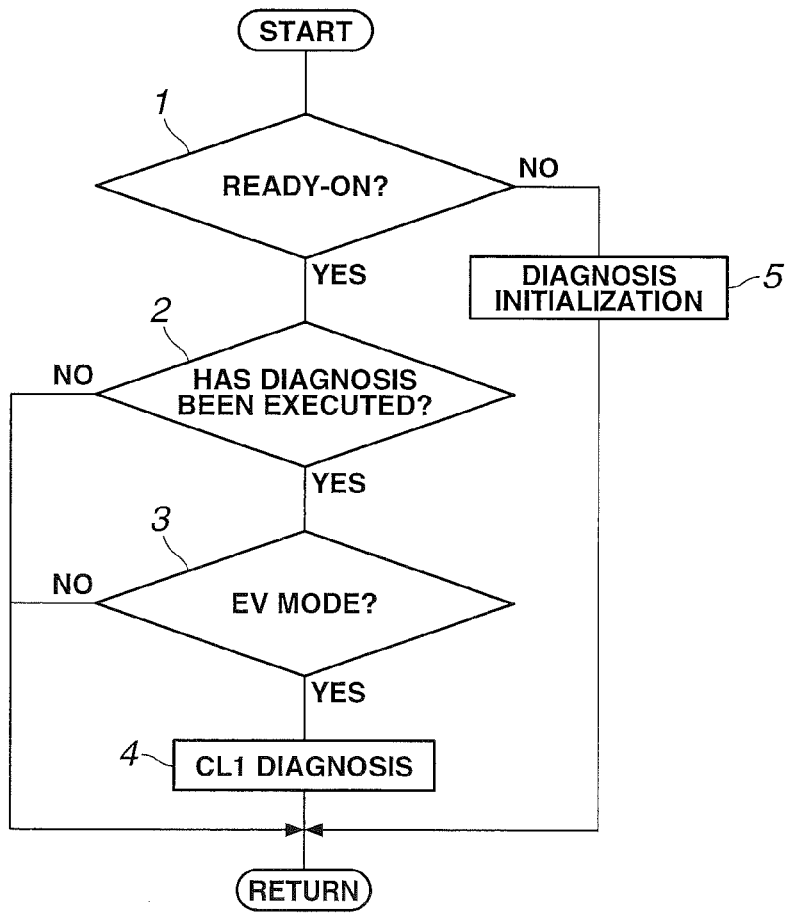
FIG. 3 is a flowchart for a first clutch diagnosis process according to one or more embodiments of the present invention.

The flowchart routine of FIG. 3 is performed repeatedly at predetermined operation cycles during operation of the hybrid vehicle. Although the diagnosis process is executed by the integrated controller 23 in the one or more embodiments of the present invention, it is alternatively feasible to execute the diagnosis process by the other controller such as CVT controller 21.

As shown in FIG. 3, it is first judged in step 1 whether or not the vehicle system is in a READY-ON status where the vehicle is ready for running. The READY-ON status is established upon execution of predetermined processing such as system initialization and hydraulic activation after a main switch of the vehicle is turned on by driver's operation. The vehicle system is shifted to a READY-OFF status by execution of predetermined processing when the main switch of the vehicle is turned off by driver's operation after the running of the vehicle.

When the vehicle system is in the READY-ON status, the control proceeds from step 1 to step 2. In step 2, it is judged whether the diagnosis execution flag is set indicating that the diagnosis of the first clutch 4 has already been executed. In one or more embodiments of the present invention, it suffices to execute one diagnosis during one trip (i.e. operation period from the turn-on to the turn-off of the vehicle main switch). The control exits from the routine of FIG. 3 when the diagnosis has already been executed.

When the diagnosis has not yet been executed, the control proceeds to step 3. In step 3, it is judged whether the vehicle is in the EV mode. When the vehicle is not in the EV mode, the control exits from the routine of FIG. 3 without executing the diagnosis of the first clutch 4. When the vehicle is in the EV mode, the control proceeds to step 4 for the diagnosis of the first clutch 4. As the first clutch 4 should be released during the EV mode, the diagnosis of the first clutch 4 is executed in step 4 to judge whether or not the first clutch 4 is normally in the released state. For example, the diagnosis is executed during rotation of the motor generator 2 by comparing the rotation speed Nm of the motor generator 2 with the rotation speed Ne of the engine 1. In the released state of the first clutch 4, the rotation speed Ne of the engine becomes 0 or much lower than the rotation speed Nm of the motor generator 2. It is thus judged that the first clutch 4 is in a fixed state when the rotation speed Ne of the engine 1 is relatively close to the rotation speed Nm of the motor generator 2. Alternatively, it may simply be judged that the first clutch 4 is in the fixed state when the rotation speed Ne of the engine 1 is higher than or equal to a given threshold value.

After the completion of the diagnosis in step 4, the diagnosis execution flag is set for the judgment in step 2. When the vehicle system is judged in step 1 as being in the READY-OFF status, the diagnosis execution flag is cleared in step 5 such that the diagnosis is executed again during the next trip.

Although the first clutch 4 is of the normally open type in one or more embodiments of the present invention, it is feasible to execute the diagnosis of the first clutch 4 in the same manner as above even in the case where the first clutch 4 is of the normally closed type.

As mentioned above, the released state diagnosis of the first clutch 4 is executed only in the EV mode where the first clutch 4 should be in the released state. It is therefore possible to immediately execute the diagnosis of the first clutch 4 when the vehicle starts running in the EV mode after set to the READY-ON status. When the signal ACSW of the air conditioner switch 44 is ON, by contrast, the HEV mode is selected for driving of the compressor 42. In this case, there cannot be obtained an opportunity to perform the diagnosis of the first clutch 4 when the signal ACSW of the air conditioner switch 44 is ON from the start of miming of the vehicle.

In view of the above circumstance, the integrated controller is configured to, when the HEV mode is selected in response to the operation request for the air conditioner 44, forcibly execute the diagnosis of the first clutch 4 upon temporarily switching the running mode to the EV mode in the one or more embodiments of the present invention.

Figure 4:
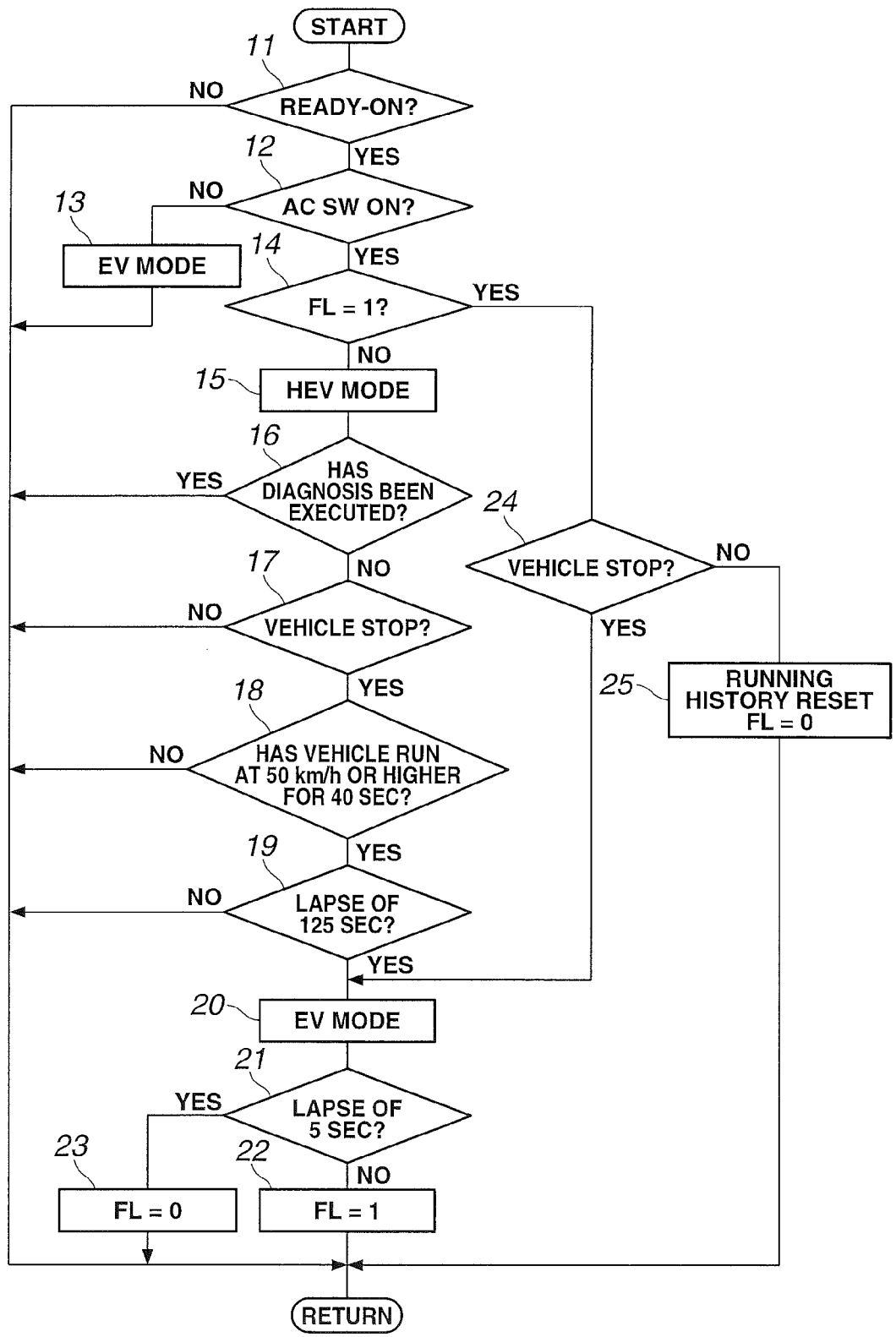
FIG. 4 is a flowchart for a diagnostic running mode selection process according to one or more embodiments of the present invention.

FIG. 4 is a flowchart for selection and switching of the running mode in association with the operation request for the air conditioner 44 and the forcible diagnosis of the first clutch 4. The flowchart routine of FIG. 4 is performed by the integrated controller 23 repeatedly at predetermined operation cycles during operation of the hybrid vehicle.

As shown in FIG. 4, it is first judged in step 11 whether or not the vehicle system is in the READY-ON status. When the vehicle system is not in the READY-ON status, the control exits from the routine.

Next, it is judged in step 12 whether or not the signal ACSW of the air conditioner switch 44 is ON. The control proceeds to step 13 when the air conditioner 41 is stopped, i.e., when the signal ACSW is OFF. In step 13, the selection of the EV mode is permitted according to the other mode selection conditions (such as the required driving force, the state of charge of the high-voltage battery 12 etc.). In consequence, the vehicle is generally started in the EV mode when the air conditioner 41 is OFF. In this case, the diagnosis of the first clutch 4 is performed according to the routine of FIG. 3.

When the air conditioner 41 is ON (i.e. when the signal ACSW is ON), the control proceeds to step 14 and then to step 15. In step 14, the after-mentioned flag FL is judged. In step 15, the HEV mode is selected. The flag FL is generally set to "0" except for a given time period (e.g. 5 seconds) during which the running mode is forcibly switched to the EV mode.

Thus, the vehicle is basically driven in the HEV mode during operation of the air conditioner 41. The judgments in steps 16 to 19 are made repeatedly over such HEV-mode driving.

In step 16, it is judged whether the diagnosis execution flag is set indicating that the diagnosis of the first clutch 4 has already been executed in the same manner as in step 2. As mentioned above, one diagnosis is executed during one trip in one or more embodiments of the present invention. The control exits from the routine of FIG. 4 when the diagnosis has already been executed.

In step 17, it is judged whether or not the vehicle is in a stop state. The stop state of the vehicle is actually judged by checking whether the vehicle running speed VSP becomes lower than or equal to a given threshold value at which the vehicle is regarded as being stopped. The threshold value can be set to e.g. about 4 km/h. Unless the vehicle is in the stop state, the running mode is not forcibly switched to the EV mode for the diagnosis of the first clutch.

When the vehicle is in the stop state, the control proceeds to step 18. In step 18, it is judged whether or not a running history of the vehicle from the previous stop state to the current stop state satisfies a predetermined condition. For example, it is judged whether or not the vehicle has run at a vehicle running speed VSP of 50 km/m or higher for 40 seconds. This condition corresponds to the condition where the interior of the vehicle is sufficiently cooled so that there would be no problem even when the air conditioner 41 is stopped for a short term. As a matter of course, the present invention is not limited to the above specific numerical condition. The predetermined condition is set as appropriate according to the size of the vehicle etc. Although the vehicle running speed VSP and the vehicle running time are used as two conditional parameters in one or more embodiments of the present invention, it is feasible to judge the satisfaction of the predetermined condition in the case where the vehicle has run at a predetermined running speed or higher even for a short time or in the case where the vehicle has run for a predetermined time or longer with no limitation on running speed.

When the running condition of step 18 is satisfied, the control proceeds to step 19. In step 19, it is judged as an additional running condition whether a predetermined time period e.g. 125 seconds has elapsed since shifting of the vehicle into the READY-ON status. The reason for this is that, even when the running condition of step 18 is satisfied, the interior of the vehicle may not be sufficiently cooled because of too short time lapsed from the start of operation of the vehicle. When the judgment result in step 18 or step 19 is NO, the control exits from the routine without executing the forcible diagnosis of the first clutch 4 at the current vehicle stop.

When both of the running conditions of steps 18 and 19 are satisfied, the control proceeds from step 19 to step 20. In step 20, the running mode is forcibly switched to the EV mode. Upon switching to the EV mode, the first clutch 4 is released; and the engine 1 is stopped. As a result, the cooling function of the air conditioner 41 is temporarily stopped by stop of the compressor 42.

Subsequently, it is judged in step 21 whether the given time period e.g. 5 seconds has elapsed since switching of the running mode to the EV mode in step 20. Up until the lapse of 5 seconds, the flag FL is set to "1" in step 22. After the lapse of 5 seconds, the flag FL is set to "0" in step 23. This given time period (5 seconds) is set according to the time required for the diagnosis of the first clutch 4 in step 4.

In step 14, the status of the flag FL is judged. When the flat FL is judged as "1" in the stop state of the vehicle, the control proceeds from step 14 to step 20. In step 20, the EV mode is continued. In other words, the EV mode is forcibly selected during the lapse of 5 seconds from the satisfaction of the running conditions of steps 18 and 19 even in the case where the signal ACSW of the air conditioner 41 is ON. Accordingly, the diagnosis of the first clutch 4 is executed in step 4 as the judgment result in step 3 becomes YES in the above-mentioned diagnosis process.

After the lapse of 5 seconds since switching of the running mode to the EV mode, the flag FL is set to "0" in step 23. In this case, the control proceeds from step 14 to step 15. In step 15, the HEV mode is again selected. Then, the compressor 42 is driven by the engine 1 so that the cooling function of the air conditioner 41 is recovered.

In one or more embodiments of the present invention, it is not judged whether the diagnosis of the first clutch 4 has been completed within the time period of 5 seconds during which the running mode is switched to the EV mode. The time period (5 seconds) during which the running mode is switched to the EV mode and the timing at which the running mode is switched back to the HEV mode are irrelevant to the completion of the diagnosis.

On the other hand, it is judged in step 24 whether or not the vehicle remains in the stop state during the time period in which the running mode is forcibly switched to the EV mode (i.e. during the lapse of 5 seconds). Namely, it is judged whether or not the running of the vehicle has been restarted. When the running of the vehicle has been restarted before the lapse of 5 seconds, the control proceeds to step 25. In step 25, the vehicle running history as the basis for the judgment in step 18 is reset; and the flag FL is set to "0". In this case, the control proceeds from step 14 to step 15. Then, the HEV mode is selected immediately in step 15.

FIG. 5 is a time chart showing an example of the effects of one or more of the above embodiments. In the time chart, the vehicle running speed VSP, the engine rotation speed Ne and the flag FL are indicated along with some judgement results for purposes of illustration.

In this example, the vehicle is started immediately after set to the READY-ON status and then stopped at time t1 after running at a vehicle running speed VSP of 50 km/m or higher for 40 seconds or more. At the time the vehicle is stopped, 125 seconds or more have elapsed since shifting of the vehicle into the READY-ON status. As mentioned above, the vehicle is judged as being stopped when the vehicle running speed VSP becomes 4 km/h or lower.

As shown in the chart, the history condition judgment signal is pulsed on when the vehicle has run at a vehicle running speed VSP of 50 km/m or higher for 40 seconds. Simultaneously with the pulse-on of this judgment signal, the engine stop permission flag is set to "1". Further, the vehicle stop judgment flag is set to "1" in the stop state of the vehicle. When both of the engine stop permission flag and the vehicle stop judgment flag are set to "1", the flag FL is set to "1". Consequently, the running mode is switched to the EV mode whereby the engine 1 is stopped. After the lapse of 5 seconds from the stop of the engine 1, the five-second lapse judgment signal is pulsed on. The engine stop permission flag is set to "0" at the pulse-on of the five-second lapse judgment signal. Then, the flag FL is set to "0". The running mode is consequently switched back to the HEV mode whereby the operation of the engine 1 is restarted.

In this way, the diagnosis of whether the first clutch 4 is normally in the released state is performed during selection of the EV mode where the first clutch 4 should be released in one or more of the above embodiments. In the case where the vehicle is driven in the HEV mode in response to the operation request for the air conditioner 41, the judgment of whether or not it is permissible to stop the cooling function of the air conditioner for a short term is made based on the vehicle running history in the stop state of the vehicle. When the short-term stop of the cooling function is permissible, the vehicle running mode is temporarily switched to the EV mode. Then, the diagnosis of the first clutch 4 is executed. It is thus possible to complete the diagnosis of the first clutch 4 at a relatively early stage of each trip irrespective of whether the air conditioner switch 44 is ON.

Although the cooling function of the air conditioner 41 is stopped for a short term upon switching to the EV mode, the vehicle is in the stop state so that there is no fear of visibility deterioration due to window glass fogging etc. in one or more of the above embodiments.

Furthermore, the permission or non-permission of switching to the EV mode is judged based only on the vehicle running history without consideration of the interior temperature of the vehicle, the operation state of the air conditioner 41 etc. in one or more of the above embodiments. It is thus possible to simplify the diagnosis control and perform the diagnosis control only by the integrated controller 23 independently of the detection signal from the air conditioner 41. It is also possible to assuredly execute the diagnosis of the first clutch 4 even in the case where the outside temperature is high.

In the above example of FIG. 5, the running history condition is set that the running of the vehicle has been continued at a predetermined vehicle running speed (e.g. 50 km/h) or higher for a predetermined time (e.g. 40 seconds). It is alternatively feasible to set the running history condition that, when the time of running of the vehicle at a predetermined vehicle running speed (e.g. 50 km/h) is integrated during a period from the start to stop of the vehicle, the thus-integrated time reaches a predetermined time (e.g. 40 seconds).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device for a hybrid vehicle comprising an engine, a motor, a clutch and an air conditioner, the engine and the motor being connected to each other via the clutch, the air conditioner having a compressor driven by the engine, the control device comprising:
    a controller,
    wherein the hybrid vehicle comprises running modes of
        an EV mode in which the engine is disconnected from the motor by release of the clutch, and
        an HEV mode in which the engine rotates together with the motor by engagement of the clutch,
    wherein, the controller is configured to execute a diagnosis of whether the clutch is in a released state during selection of the EV mode; and
    wherein, when the HEV mode is selected in response to an operation request for the air conditioner, the controller temporality switches the running mode to the EV mode based on a running history of the hybrid vehicle in a stop state of the hybrid vehicle, then executes the diagnosis.

2. The control device for the hybrid vehicle according to claim 1, wherein the running history includes satisfaction of a condition that the hybrid vehicle has run at a predetermined speed or higher for a predetermined time before the stop state of the vehicle.

3. The control device for the hybrid vehicle according to claim 2, wherein the running history includes satisfaction of an additional condition that a predetermined time has elapsed since shifting of the vehicle into a READY-ON status during the stop state of the vehicle.

4. The control device for the hybrid vehicle according to claim 1, wherein the diagnosis is executed once per trip.

5. A control method for a hybrid vehicle comprising an engine, a motor, a clutch and an air conditioner, the engine and the motor being connected to each other via the clutch, the air conditioner having a compressor driven by the engine, comprising
    switching the hybrid vehicle between running modes of:
        an EV mode in which the engine is disconnected from the motor by disengagement of the clutch, and
        an HEV mode in which the engine rotates together with the motor by engagement of the clutch;
    executing a diagnosis of whether the clutch is in a released state during selection of the EV mode; and
    when the HEV mode is selected in response to an operation request for the air conditioner, temporality switching the running mode to the EV mode based on a running history of the hybrid vehicle in a stop state of the hybrid vehicle, then executing the diagnosis.

\* \* \* \* \*